United States Patent
Guzik et al.

(10) Patent No.: US 6,633,672 B1
(45) Date of Patent: *Oct. 14, 2003

(54) HANDWRITING RECOGNITION METHOD AND APPARATUS HAVING MULTIPLE SELECTABLE DICTIONARIES

(75) Inventors: Kenneth J. Guzik, Santa Clara, CA (US); Alan P. Huff, Cupertino, CA (US); Ronjon Nag, Palo Alto, CA (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/524,064

(22) Filed: Mar. 13, 2000

Related U.S. Application Data

(63) Continuation of application No. 08/580,265, filed on Dec. 28, 1995, now Pat. No. 6,055,333.

(51) Int. Cl.[7] ................................................. G06K 9/00
(52) U.S. Cl. ....................................................... 382/189
(58) Field of Search ................................ 382/101, 187, 382/189, 137, 217, 218, 229

(56) References Cited

U.S. PATENT DOCUMENTS

| | | | | | |
|---|---|---|---|---|---|
| 4,531,231 A | * | 7/1985 | Crane et al. | .................. | 382/13 |
| 4,573,196 A | * | 2/1986 | Crane et al. | .................. | 382/13 |
| 5,031,223 A | * | 7/1991 | Rosenbaum et al. | ........... | 382/1 |
| 5,265,174 A | * | 11/1993 | Nakatsuka | .................... | 382/38 |
| 5,267,327 A | * | 11/1993 | Hirayama | .................... | 382/13 |
| 5,361,310 A | * | 11/1994 | Ishigaki | ...................... | 382/13 |
| 5,535,120 A | * | 7/1996 | Chong et al. | .......... | 264/419.03 |
| 5,655,136 A | * | 8/1997 | Morgan | ..................... | 382/182 |
| 5,734,749 A | * | 3/1998 | Yamada et al. | ............. | 382/187 |
| 5,754,671 A | * | 5/1998 | Higgins et al. | ............. | 382/101 |
| 5,805,710 A | * | 9/1998 | Higgins et al. | ............. | 382/101 |
| 5,903,667 A | * | 5/1999 | Kuzunuki et al. | .......... | 382/187 |
| 5,963,666 A | * | 10/1999 | Fujisaki et al. | ............. | 382/187 |

* cited by examiner

*Primary Examiner*—Andrew W. Johns
(74) *Attorney, Agent, or Firm*—Romi N. Bose; Hisashi D. Watanabe

(57) ABSTRACT

Multiple selectable dictionaries are used by a handwriting recognition system to provide accurate and prompt recognition processing. Sets of the multiple dictionaries are selectable by the user or automatically by the recognition program in response to the user handwriting in predetermined fields on a user interface.

15 Claims, 4 Drawing Sheets

HANDWRITING RECOGNITION METHOD AND APPARATUS HAVING MULTIPLE SELECTABLE DICTIONARIES

The present application is a continuation of prior U.S. application Ser. No. 08/580,265, filed on Dec. 28, 1995, now U.S. Pat. No. 6,055,333, which is hereby incorporated by reference, and priority thereto for common subject matter is hereby claimed.

FIELD OF THE INVENTION

This invention relates generally to the field of handwriting recognition, and more particularly to handwriting recognition data templates used in handwriting recognition systems.

BACKGROUND OF THE INVENTION

Handwriting recognition programs generally operate by comparing data generated from handwritten words or characters to stored recognition data (referred to as a dictionary by those skilled in the art) in an attempt to correctly replicate the handwritten words or characters as typewritten text. As commercial applications for handwriting recognition become more prominent in the marketplace, the trend has been to increase the size of the dictionary to make the recognition program more general in nature so as to be universally useful in various applications.

However, continually increasing the size of the dictionary can lead to diminishing returns in the context of reduced recognition accuracy. Also, a large dictionary can lead to increased recognition processing, which manifests itself to the user as a slower recognition response time. Some more advanced handwriting recognition programs have attempted (with mixed results) to compensate for a large recognition dictionary by including weighting values associated with some or all of the stored recognition data that are used in the recognition process to improve the likelihood of correctly recognizing the handwritten input.

Nevertheless, there exists a need for a handwriting recognition system that may find wide application without compromising recognition accuracy and speed.

DESCRIPTION OF A PREFERRED EMBODIMENT

Figure 1:
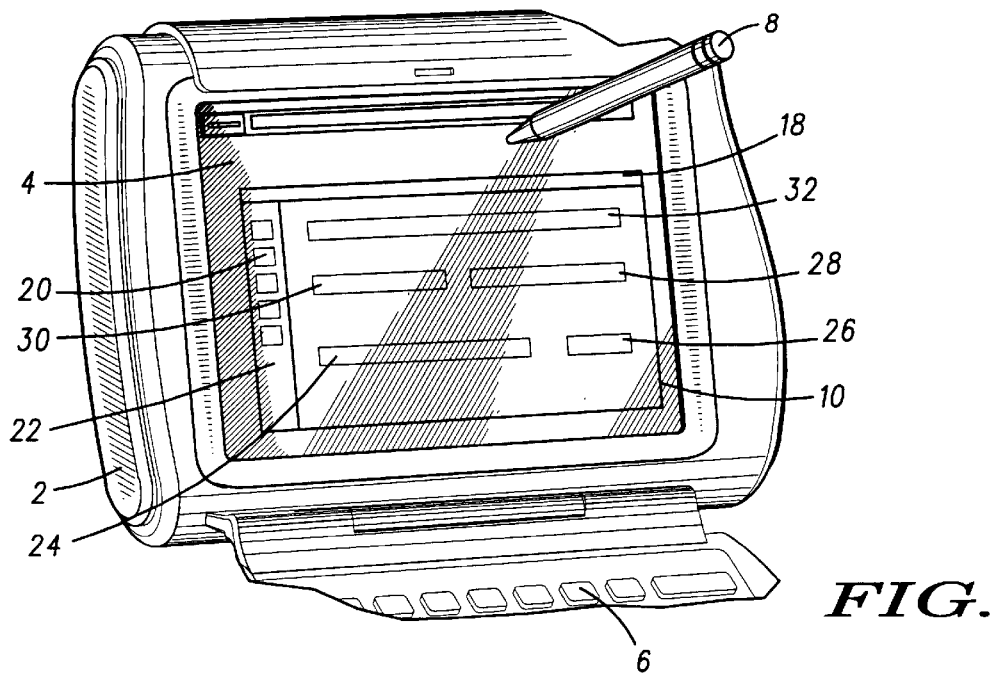
FIG. 1 is a perspective view of a computing device in accordance with the present invention.
Figure 2:
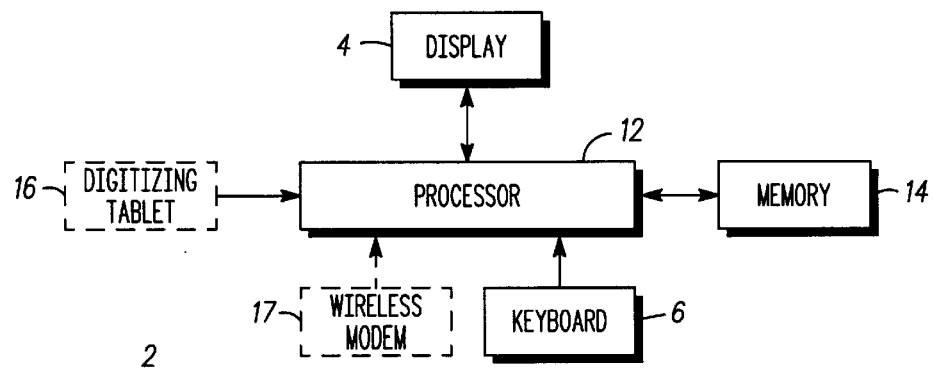
FIG. 2 is an exemplary block diagram of the computing device of FIG. 1.

FIG. 1 and FIG. 2 illustrate a computing device 2 suitable for use with the present invention. The computer device 2 may be, for example, a Thinkpad lap-top type computer made by IBM. Alternately, a personal digital assistant, such as the Newton manufactured by Apple Computer, or the Envoy wireless communicator, made by Motorola, or similar computing devices could be employed with the present invention. As shown in FIG. 1, the computing device 2 includes a digitizing display 4 that may be used as an alternate to the keyboard 6 to input information by using a stylus 8 to select functions, enter instructions, or handwritten text, graphics, or other information onto the display 4.

As is known, contemporary computing devices typically include a processing component 12 such as a microprocessor or digital signal processor that, together with other general circuitry, execute the instructions of one or more software programs residing in a memory 14 that may include an operating system to control the functionality and operation of the computing device 2. Optionally, a conventional digitizing tablet 16 may be used to enter printed or handwritten words or text allowing a conventional (non-digitizing or non-touch sensitive) display to be employed for the display 4. Another option comprises a wireless modem (radio) 17 for transmitting, receiving, or transceiving information such as the Envoy wireless communicator is capable of doing.

Referring to FIG. 1, the display 4 may be seen to present a graphic user interface commonly referred to by those skilled in the art as a window 10. The window 10 is associated with a computer application program or other computer program, and it is know for the particular association between a window and computer program to be displayed to the user via providing the name or identification of the computer program in an area of the window referred to as a title bar 18. Generally, certain user commands or instructions are given to the computer program via user selection of one or more icons 20 that ordinarily reside in a area of the graphic user interface know as a toolbar 22 by those skilled in the art.

As can be seen in FIG. 1, the window 10 includes several fields 24–32 for receiving user handwriting via the stylus 8. In the present invention, one field may be used or any number of fields may be used according to the application. According to the present invention, the recognition system comprises several dictionaries containing recognition data (with or without weighting). The present invention contains the size of any particular dictionary to a point that does not compromise recognition accuracy, but offers more universal application via selectively activating sets of dictionaries as appropriate for the application. In one embodiment, the user may select which dictionaries are active for use by the recognition system. In another embodiment, appropriate sets of dictionaries are automatically activated by the user handwriting in a particular field 24–32 of the window 10.

Figure 3:
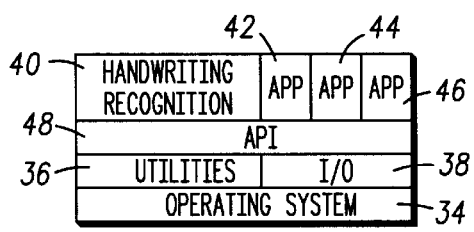
FIG. 3 is a graphic diagram illustrating an exemplary software program configuration of the device of FIG. 1 in accordance with the present invention.
Figure 4:
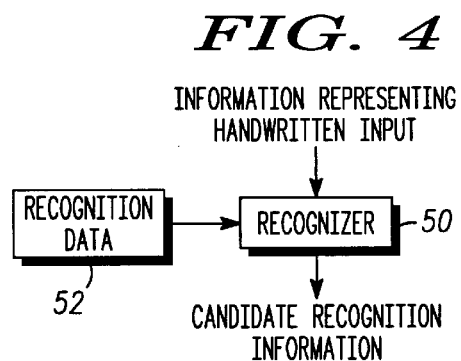
FIG. 4 is a block diagram of the exemplary recognition program of FIG. 3 that may be used in accordance with the present invention.

FIG. 3 illustrates a software program arrangement in accordance with the present invention to enable the computing device 2 of FIG. 1 to utilize the present invention. Overall control of the computing device is governed by an operating system 34. Typical operating systems includes utility programs 36 and input/output (I/O) 38 control, and generally interfaces with other software programs (40–46) via an application programming interface (API) 38. In the preferred embodiment of the present invention a software program 40 for recognizing handwritten user input resides above the API layer and includes instructions and data to implement printing and/or cursive handwriting recognition.

The present invention can be understood generally with reference to FIG. 1 through FIG. 4 in that a user could handwrite text (for example) onto the display 4 via the stylus 8. Typically, the user's handwritten input is electronically displayed (which is referred to by those skilled in the art as "ink") in the window 10 (which in this example is associated with a handwriting recognition program). The I/O control portion 38 of the operating system 34 digitizes the handwriting (ink) via known techniques and sends information representing the handwritten input to the handwriting recognition program 40 via the API 48. Executing the instructions of the user input recognition program 38 (for example, the Lexicus Longhand cursive handwriting recognition program or the QuickPrint print recognition program, both by the Lexicus Division of Motorola), the computing device 2 performs the functionality of any known handwriting recognition engine 50 and operates to compare the information representing the handwritten input with all or a selected set of a plurality dictionaries that contain stored recognition data 52. Depending upon which dictionaries are active, the recognition data (commonly referred to by those skilled in the art as templates) is processed with the information representing the user handwritten input. The output of the recognition engine 46 is a list of candidate recognition information that, if correctly recognized, replicates the handwritten input as typewritten text on the display 4 and may be transferred, passed, or sent from the recognition program 40 to one of the other application programs (such as a word processing program).

Figure 5:
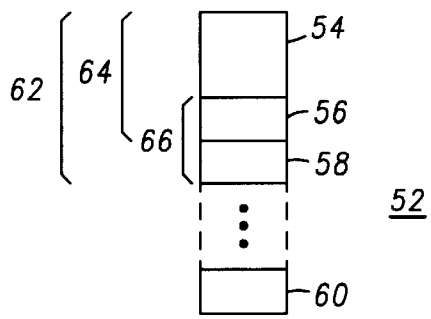
FIG. 5 is an illustration of the organization of the recognition data in accordance with the present invention.

FIG. 5 illustrates a preferred multiple dictionary arrangement for the recognition data 52 arrangement in accordance with the present invention. As can be seen, the recognition data 52 comprises a plurality of dictionaries 54–60 that are selectively activated by the user or automatically by the recognition program 40. For example, upon detection of a user writing in field 24 of window 10 in FIG. 1, a set 62 of the dictionaries 54–58 might be activated. Also, when the user writes in field 32, the set of dictionaries 64 could be activated, while writing in the field 28 might automatically activate set 66 of dictionaries 56 and 58.

According to the invention, one of the dictionaries (60 for example) can be added to by the user so that certain proper names, acronyms, and other words not contained in the other dictionaries can be added for use by the recognition system. The other dictionaries are preferably divided into general and specialty areas such as: U.S. State Names; Prescription Drug Names; Over-the-counter Drugs; City or County Names; Historical Names, Events, or Places; Medical Terms (or medial specialties such as optometry) Legal Terms (or legal specialties such as patent law); U.S. President Names; a Main Dictionary (that may be generally active with selected other dictionaries); or only Numbers. Moreover, since in the preferred embodiment the dictionaries are data stored in a memory (14 of FIG. 2), additional dictionaries may be added or replaced by the user.

Figure 6:
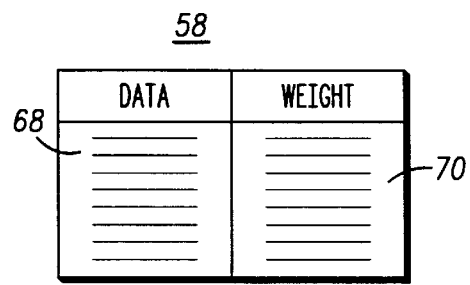
FIG. 6 is an exemplary illustration depicting an optional embodiment included weighted recognition data in accordance with the present invention.

FIG. 6 is an exemplary illustration of dictionary 58 in the form of a table that is preferably stored in memory (14 in FIG. 2) components of the computing device. In this embodiment, the dictionary 58 includes a plurality of data templates 68 each having a weighting value 70 associated therewith. Any known data association technique (e.g., vectors, pointers, tables, or appending data) is suitable for use with the present invention to associate a particular data template with its weighting value. Alternately, the present invention contemplates that only certain of the data templates, such as, for example, the data templates known to cause the most recognition errors, could have an associated weighting value. The weighting values 70 are used by the recognition engine (50 in FIG. 4) via established practices to enhance the likelihood that the candidate recognition information correctly replicates the handwritten input.

In this alternate embodiment, templates for a handwritten word may reside in multiple of the dictionaries some having differing weighting values depending upon the dictionary. For example the city name "Chicago" may have a relative high weighting value in a City Name dictionary as compared to the Main dictionary, which left to itself my recognize that handwritten city name as "(hicago". According to the invention, when multiple active dictionaries contain templates for the same word, the recognizer returns only the word associated with the template having the highest weighting value from the various active dictionaries as the candidate recognition information for presentation to the user. This permits other candidate words to be presented to the user in an editing mode should a recognition error be made due to poor handwriting or other causes.

Figure 9:
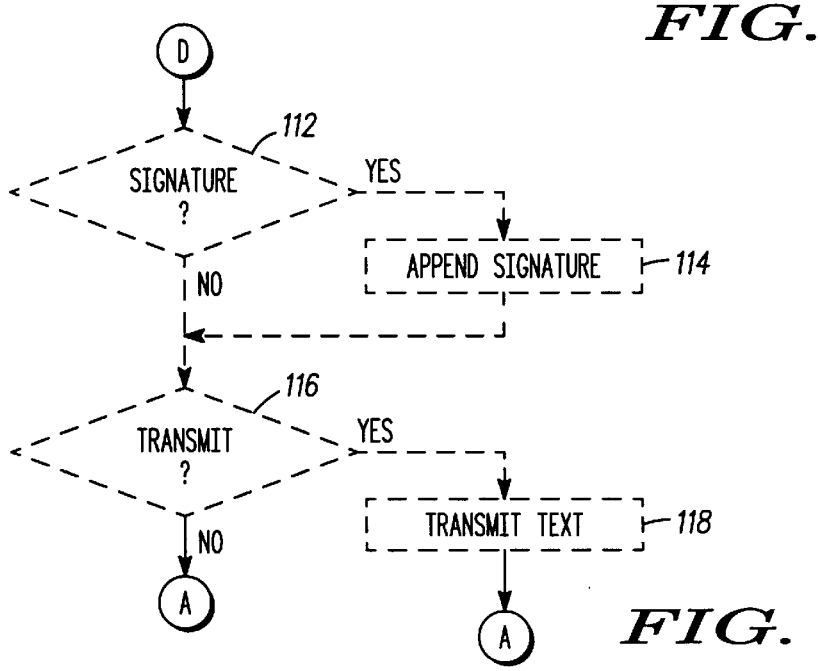
FIG. 7, FIG. 8, and FIG. 9 are flow diagrams illustrating a preferred method in accordance with the present invention.
Figure 7:
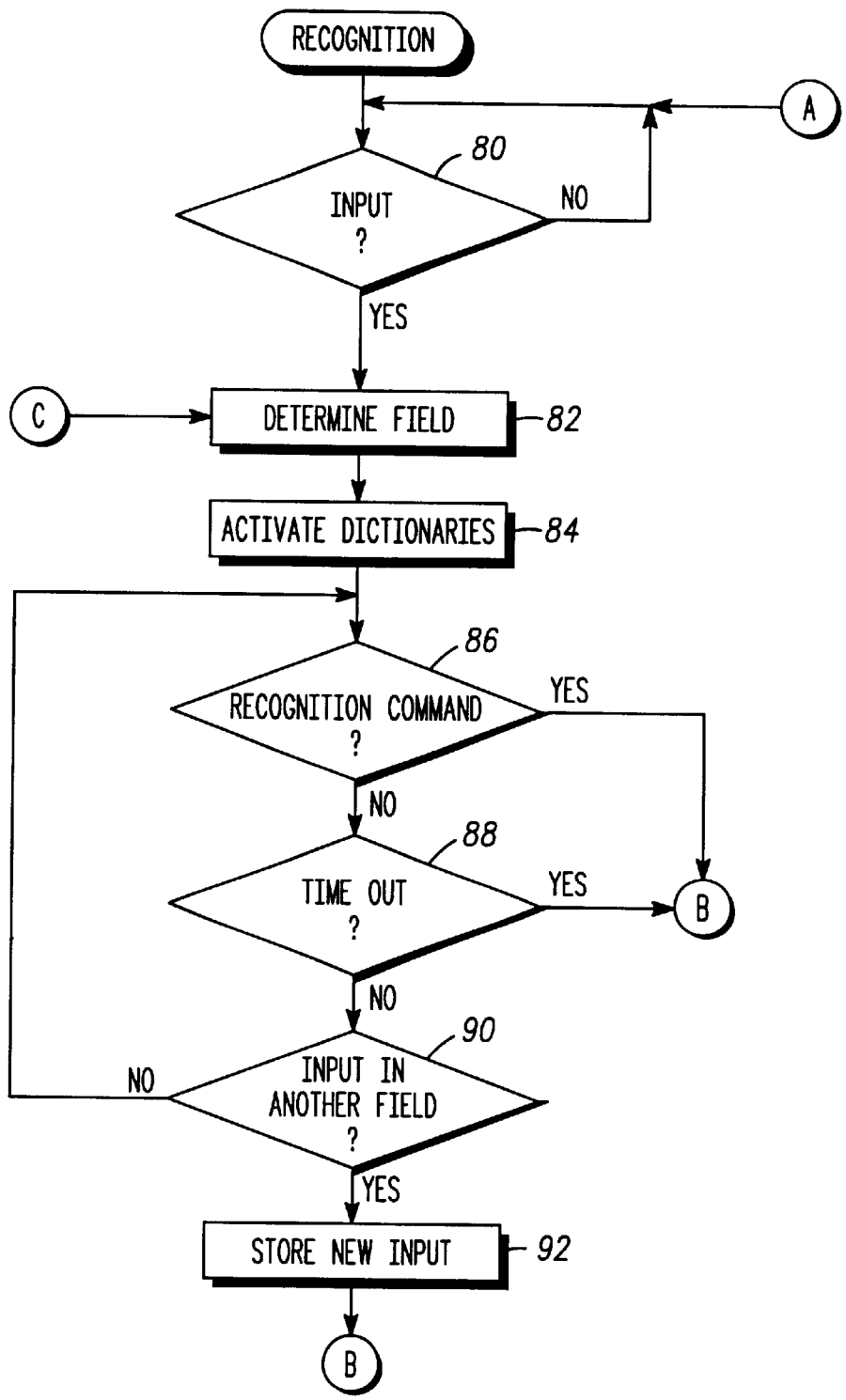
Figure 8:
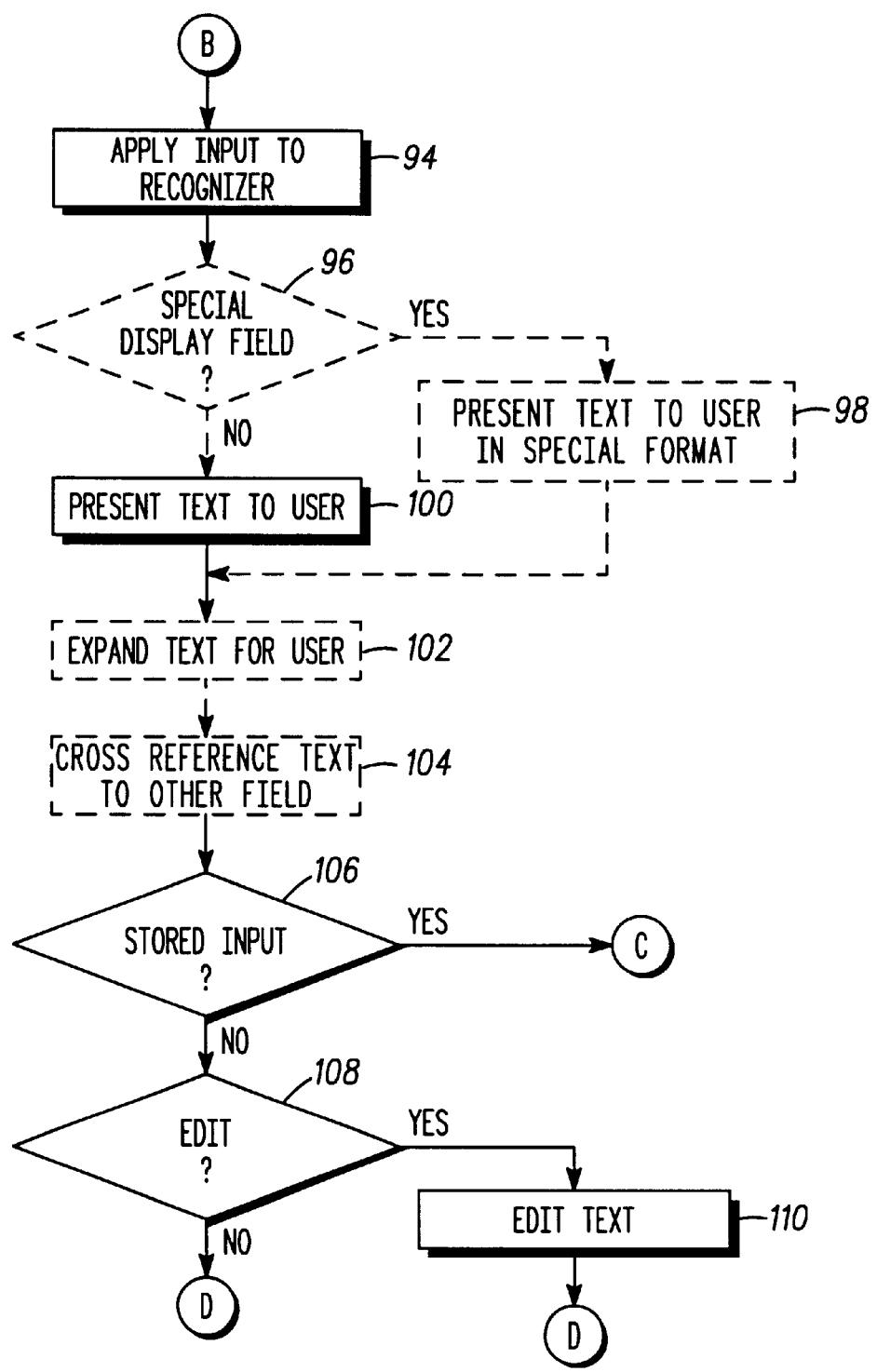

FIG. 7, FIG. 8, and FIG. 9 are flow diagrams that, together with FIG. 1, illustrate the preferred method of the present invention. Upon detection of input (decision 80), the field receiving the input (assuming more that one field is used) is determined (step 82) and the set of dictionaries associated with that field are activated in step 84 (or the user selected set in the one field case). Decision 86 determines whether the user has instructed that the handwritten input be processed such as by the user selecting a particular icon 20 from the toolbar 22. If recognition has not been user initiated, decision 88 determines whether a time interval has elapsed from the conclusion of input (referred to as pen-up by those skilled in the art). If the time interval has not elapsed, decision 90 determines whether the user has started handwriting input in another field, from which an inference is drawn that the input in the prior field is complete and can be applied to the recognition system. An affirmative determination from decision 90 stores the new input (step 92) after which, and in the case of affirmative determinations from decisions 86 or 88, the input is applied to the recognizer for processing with the active dictionaries in step 94.

After recognition, decision 96 optionally determines whether the field receiving the input has special presentation or display parameters associated with it. For example, a field might be selected by a user to present recognized text in all capital letters. A field associated with telephone numbers could automatically group numbers for area code and prefix and insert dashes ("-") in between. If special presentation formats are not used, the recognized text is presented to the user (step 100), however, the present invention contemplates an optional step 102 wherein the recognized text or character might be expanded to form complete words for phrases preset by the user or contained in a dictionary. For example a check character (√) or a "Y" can be expanded to "Yes", while a "N" or dash character ("-") can be expanded to "No". In a medical application, recognized text such as "Tyl 350 2×" could be expanded to "Tylenol 350 mg Take Twice A Day".

Another option contemplated by the present invention for multiple field applications comprises step 104 which cross-references text recognized in one field to known associated text in other fields. For example, in a legal or medical application, a client or patient name can be cross-referenced to the associated client or patient number and/or case number or chart number. Address and phone numbers can be automatically completed in the appropriate fields. Further examples range from relative simple phone/address book applications where the fields can include: Name field; Address field; City field; State field; Zip Code field; and Phone Number field. A more complicated application includes medical applications where the fields can include: Name field; Patient Number field; Drug field; Drug strength field; Frequency (of taking medication) field; Refill field; and General Instruction field. Legal applications are also contemplated where the field can include: Client Name field; Client Number field; Matter Number field; Other Party field; Other Firm field; Other Counsel field; Contact Information field; and Issues field.

After the recognized text has been present using any of the various options contemplated by the present invention, decision 106 determines whether any user input was stored in 92 indicating that more input remains to be recognized. If so, the flow returns to step 82 to determine the field in which the stored text was entered and the flow proceeds for activating appropriate dictionaries and recognizing the text as described above. Conversely however, if no stored input remains to be recognized, decision 108 determines whether the user desires to edit any recognition errors in the recognized text such as by selecting a particular icon 20 in FIG. 1. If so, errors may be corrected using any known technique, the present invention contemplates the editing method used not offer as alternative words the same words from other dictionaries as described above in conjunction with FIG. 6.

Once the recognized text is correct, decision 112 determines whether the user desires to append an optional signature or other information to the recognized text as a measure of authentication. This alternate embodiment is particularly useful with the present invention in a medical application such as to authenticate a prescription from a medical doctor. If a signature is desired, it is appended in step 114 to the text or into a signature field.

Decision 116 determines whether the optional wireless modem (17 in FIG. 2) is used in the application of the present invention such as to transmit a prescription to a pharmacy to be filled for a patient. If so, the information (with our without the signature) is transmitted in step 118 prior to returning to FIG. 7 to await further input from the user.

Figure 10:
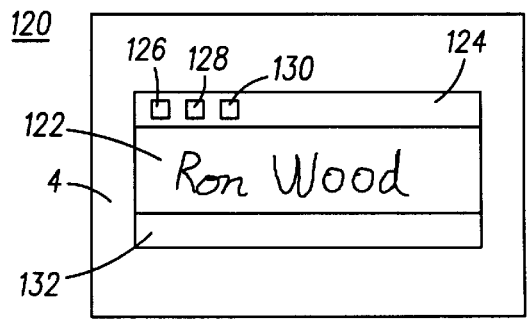
FIG. 10 is an illustration of an optional signature embodiment in accordance with the present invention.

FIG. 10 illustrates an alternate preferred embodiment for optionally entering a personal signature or other symbol to be used as authentication information according to the present invention. An authentication or signature mode can be selected for example by the user selecting a particular icon 20 in the tool bar 22 of FIG. 1. In this mode, a graphical image (window) 120 is presented to the user on the display 4 of the computing device 2 of FIG. 1. Preferably, the graphical image 120 includes a signature area 122 and may also include a command (tool bar) area 124 that includes several icons 126–130 used to affect editing or other functions and a status area 132 used to convey information to the user. In the illustrated example, the signature "William Smith" has been handwritten in the signature area 124 to be stored and later appended to other handwritten input or sent to other application programs (34–38 in FIG. 3) for the convenience of the user. According to the invention, the signature "ink" is not applied to the recognizer, but rather, is stored as information representing the "ink" to be used, for example, by a doctor to authenticate a drug prescription.

Accordingly, it will be appreciated by those skilled in the art that the present invention provides significant flexibility to handwriting recognition programs by activating selective sets of multiple specialized or general recognition dictionaries as described above. Several optional features of the present invention offer significant advantages for use in a wide variety of applications. Further optional variants of the present invention include the user of multiple windows (pages) that each may have one or more fields and having the active sets of dictionaries change depending upon which page (window) is being displayed to the user. Also, the recognition engine used to process the handwritten input with the active dictionaries may change depending upon the input field or window. In this regard, some fields may utilized a printed character handwriting recognizer while other field may employ a cursive handwriting recognition engine.

What is claimed is:

1. A method for handwriting recognition, comprising the steps of:

displaying a graphical image having at least one handwriting entry area to receive handwritten input;

processing information representing the handwritten input with a selected set comprising a plurality of dictionaries having stored recognition data to identify candidate recognition information, the selected set of the plurality of dictionaries being selected automatically in response to receiving the handwritten input in a particular handwriting entry area; and displaying the candidate recognition information.

2. The method of claim 1 wherein the processing step further comprises processing the information representing the handwritten input with a user selected set of the plurality of dictionaries.

3. The method of claim 1, which includes the step of expanding the candidate recognition information into expanded recognition information.

4. The method of claim 1, wherein the processing step further comprises processing information representing the handwritten input from a first handwriting entry area upon detection of handwritten input in another handwriting entry area.

5. The method of claim 1, which includes the step of transmitting the candidate recognition information.

6. The method of claim 1, wherein the selected set of the plurality of dictionaries associated with the particular handwriting entry area shares at least one common dictionary with another set of the plurality of dictionaries associated with another handwriting entry area.

7. An apparatus for handwriting recognition, comprising:

a touch-sensitive display for displaying handwriting entry areas to receive handwritten input and for displaying recognized words or characters, and for providing information representing the handwritten input;

a memory having a plurality of dictionaries each having recognition data stored therein to provide stored recognition data; and digital processing circuitry programmed to select a set comprising at least two of the plurality of dictionaries to provided selected recognition data, the set of the plurality of dictionaries being selected automatically based upon which handwriting entry area receives the handwritten input, and to compare the information representing the handwritten input with the selected recognition data to provide the recognized words or characters to the display.

8. The apparatus of claim 7 wherein the digital processing circuitry is programmed to accept user instructions or commands to select the set of dictionaries.

9. The apparatus of claim 7 wherein the digital processing circuitry is programmed to compare the information representing the handwritten input with the selected recognition data responsive to handwritten input being received in another handwriting entry area.

10. The apparatus of claim 7 which includes a timer and the digital processing circuitry is programmed to compare the information representing the handwritten input with the selected recognition data responsive to the timer.

11. The apparatus of claim 7, which includes a wireless transmitter for transmitting the recognized words or characters.

12. The apparatus of claim 7 wherein the set of the plurality of dictionaries associated with the handwriting entry area that receives the handwritten input shares at least one common dictionary with another set of the plurality of dictionaries associated with another handwriting entry area.

13. An apparatus for handwriting recognition, comprising:
- a display for displaying a plurality of handwriting entry areas, to display information representing handwritten input, and for displaying recognized words or characters;
- a digitizing input device for receiving the handwritten input and for providing the information representing the handwritten input;
- a memory having a plurality of dictionaries each having recognition data stored therein to provide stored recognition data; and
- digital processing circuitry programmed to select a set comprising at least two of the plurality of dictionaries associated with the plurality of handwriting entry areas to provided selected recognition data, the set of the plurality of dictionaries being selected automatically based upon which handwriting entry area receives the handwritten input, and to compare the information representing the handwritten input with the selected recognition data upon receiving handwritten input in another of the plurality of handwriting entry areas to provide the recognized words or characters to the display.

14. The apparatus of claim 13, which includes a wireless transmitter for transmitting the recognized words or characters.

15. The apparatus of claim 13 wherein the set of the plurality of dictionaries associated with the handwriting entry area that receives the handwritten input shares at least one common dictionary with another set of the plurality of dictionaries associated with another handwriting entry area.

* * * * *